United States Patent  
Gong

(10) Patent No.: US 10,785,207 B2
(45) Date of Patent: *Sep. 22, 2020

(54) AUTOMATIC LOGIN METHOD AND DEVICE BETWEEN MULTIPLE WEBSITES

(71) Applicant: Alibaba Group Holding Limited, George Town (KY)

(72) Inventor: Lei Gong, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/722,591

(22) Filed: Dec. 20, 2019

(65) Prior Publication Data

US 2020/0127995 A1    Apr. 23, 2020

Related U.S. Application Data

(63) Continuation of application No. 16/184,679, filed on Nov. 8, 2018, which is a continuation of application No. PCT/CN2017/079868, filed on Apr. 10, 2017.

(51) Int. Cl.
*G06F 21/00* (2013.01)
*H04L 29/06* (2006.01)
(Continued)

(52) U.S. Cl.
CPC ........ *H04L 63/0815* (2013.01); *H04L 9/0844* (2013.01); *H04L 9/32* (2013.01);
(Continued)

(58) Field of Classification Search
CPC ............. H04L 63/0815; H04L 63/0884; H04L 63/0807; H04L 9/32; H04L 67/02; H04L 9/0844

See application file for complete search history.

(56) References Cited

U.S. PATENT DOCUMENTS 8,276,190 B1    9/2012 Chang et al.
8,490,168 B1*   7/2013 Holloway ........... H04L 63/0815
                                                709/229
(Continued)

FOREIGN PATENT DOCUMENTS

CN    102882903    1/2013
CN    103053174    4/2013
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Kendall Dolly
(74) *Attorney, Agent, or Firm* — Fish & Richardson P.C.

(57) ABSTRACT

Technologies related to automatic account login are disclosed. In an implementation, a request from a user for logging in to an account of a second website associated with an account of the first website is received. The account of the first website is determined logged in to by the user. An automatic login token is generated based on one or more token generation rules agreed to by the second website for performing automatic login, and an automatic login link is generated and sent to the user, where the automatic login link includes the automatic login token, the automatic login link allowing the user to send an automatic login request that includes the automatic login token, and wherein the automatic login token is verified based on the one or more token verification rules to allow the user to automatically log in to the account of the second website.

18 Claims, 7 Drawing Sheets

(51) Int. Cl.
  *H04L 29/08* (2006.01)
  *H04L 9/32* (2006.01)
  *H04L 9/08* (2006.01)

(52) U.S. Cl.
  CPC ...... *H04L 63/0807* (2013.01); *H04L 63/0884* (2013.01); *H04L 67/02* (2013.01)

(56) References Cited

U.S. PATENT DOCUMENTS

| 2013/0081125 | A1 | 3/2013 | Ho et al. |
| 2014/0223527 | A1* | 8/2014 | Bortz .................... H04L 63/08 726/6 |
| 2015/0373005 | A1 | 12/2015 | Deurbrouck et al. |

FOREIGN PATENT DOCUMENTS

| CN | 103457738 | | 12/2013 |
| CN | 103457738 A | * | 12/2013 |
| CN | 103533447 | | 1/2014 |
| CN | 105430102 | | 3/2016 |
| CN | 105472052 | | 4/2016 |
| TW | 201209623 | | 3/2012 |
| WO | WO 0239237 | | 5/2002 |
| WO | WO 2015010558 | | 1/2015 |

OTHER PUBLICATIONS

Extended European Search Report in European Application No. 17795360.1, dated Sep. 16, 2019, 8 pages.

International Search Report by the International Searching Authority issued in International Application No. PCT/CN2017/079868 dated May 27, 2017; 8 pages.

Nakamoto, "Bitcoin: A Peer-to-Peer Electronic Cash System," www.bitcoin.org, 2005, 9 pages.

PCT International Preliminary Report on Patentability in International Application No. PCT/CN2017/079868, dated Nov. 13, 2018, 8 pages (with English translation).

PCT Written Opinion of the International Searching Authority in International Application No. PCT/CN2017/079868, dated May 27, 2017, 7 pages (with English translation).

* cited by examiner

AUTOMATIC LOGIN METHOD AND DEVICE BETWEEN MULTIPLE WEBSITES

CROSS-REFERENCE TO RELATED APPLICATIONS

This application is a continuation of U.S. patent application Ser. No. 16/184,679, filed on Nov. 8, 2018, which is a continuation of PCT Application No. PCT/CN2017/079868, filed on Apr. 10, 2017, which claims priority to Chinese Patent Application No. 201610302819.2, filed on May 9, 2016, and each application is hereby incorporated by reference in its entirety.

TECHNICAL FIELD

The present application relates to the communications field and, in particular, to an automatic login method and device among multiple websites.

BACKGROUND

In related technologies, for different websites that cooperate with each other, a user can usually use a local client of a first website to directly visit a target page on a second website. For example, the user can add a hyperlink of the target page on the second website to the local client of the first website, and the user can jump to the corresponding target page by clicking the hyperlink.

When the user visits the target page on the second website by using the local client of the first website, the second website usually requests that the user use a login ID and a password of the second website to log in to the second website so as to obtain visit authorization of the target page and jump to the target page, which can be quite inconvenient.

SUMMARY

The present application provides an automatic login method among multiple websites, and the method includes the following: querying a login status of a user's first login account on the first website, when a visit request for a target page on a second website is received from a user-side client; generating an automatic login token based on a token generation rule agreed to by the second website, if the first login account is in a logged-in state; and creating and sending a first automatic login link to the client, where the first automatic login link includes a uniform resource locator (URL) address of an automatic login portal of the second website and the automatic login token, so that the client visits the first automatic login link to send the visit request for the target page that includes the automatic login token to the automatic login portal of the second website, and, after validating the automatic login token, a server of the second website authorizes the client to perform automatic login on the second website by using a second login account bound to the first login account, and jump to the target page.

In this implementation, the method further includes the following: creating and sending a second automatic login link to the client when a resource visit request for the second website is received from the user-side client, where the second automatic login link includes a URL address of a local automatic login portal, and a URL address of the target page on the second website on which a resource requested by the client is located, so that the client visits the second automatic login link to send the visit request for the target page to the local automatic login portal.

In this implementation, the method further includes the following: sending a URL address of a local active login portal to the client to trigger the client to jump to a login page corresponding to the URL address of the local active login portal and using the first login account to complete active login, if the first login account is in a logged-off state.

In this implementation, the token generation rule agreed to by the second website includes a predetermined encryption algorithm and an encryption key that are stored in the login domain configuration information of the second website; and the generating an automatic login token based on a token generation rule agreed to by the second website includes the following: obtaining the predetermined encryption algorithm and the encryption key from the login domain configuration information of the second website and performing calculation on a token generation parameter agreed to by the second website, based on the obtained predetermined encryption algorithm and the obtained encryption key, to generate a random character string that is used as the automatic login token.

The token generation parameter includes one or a combination of the following content: the first login account, a login domain name of the first website, and a generation time of the automatic login token.

The present application further provides an automatic login method among multiple websites, the method is applied to a server of a second website and the method includes the following: querying a login status of a second login account bound to a user's first login account on a first website, when a visit request for a local target page is received from a user-side client of the first website, where the visit request includes an automatic login token generated by a server of the first website based on an appointed token generation rule; validating the automatic login token based on a token validation rule agreed to by the first website, if the second login account is in a logged-off state; and, authorizing the client to perform automatic login locally by using the second login account when the automatic login token is validated, and sending page data of the target page to the client after successful login, to trigger the client to jump to the target page.

In this implementation, the method further includes the following: if the second login account is in a logged-in state, sending the page data of the target page to the client to trigger the client to jump to the target page.

In this implementation, the method further includes the following: sending a URL address of a local active login portal to the client to trigger the client to jump to a login page corresponding to the URL address of the local active login portal and use the second login account to complete active login, when the automatic login token fails to be validated.

In this implementation, the token generation rule agreed to by the first website includes a predetermined decryption algorithm and an encryption key that are stored in local login domain configuration information; and the validating the automatic login token based on a token validation rule agreed to by the first website includes the following: obtaining the predetermined decryption algorithm and the encryption key from the local login domain configuration information, decrypting the automatic login token based on the obtained predetermined decryption algorithm and the obtained encryption key, and validating whether a parameter generated after the decryption is a token generation parameter agreed to by the first website; and if yes, determining that the automatic login token is validated.

The token generation parameter includes one or a combination of the following content: the first login account, a login domain name of the first website, and a generation time of the automatic login token.

The present application further provides an automatic login device among multiple websites, the device is applied to a server of a first website and the device includes the following: a first query module, configured to query a login status of a user's first login account on the first website, when a visit request for a target page on a second website is received from a user-side client; a generation module, configured to generate an automatic login token based on a token generation rule agreed to by the second website, if the first login account is in a logged-in state; and a transmitting module, configured to create and send a first automatic login link to the client, where the first automatic login link includes a URL address of an automatic login portal of the second website and the automatic login token, so that the client visits the first automatic login link to send the visit request for the target page that includes the automatic login token to the automatic login portal of the second website, and after validating the automatic login token, a server of the second website authorizes the client to perform automatic login on the second website by using a second login account bound to the first login account, and jump to the target page.

In this implementation, the transmitting module is further configured to create and send a second automatic login link to the client when a resource visit request for the second website is received from the user-side client, where the second automatic login link includes a URL address of a local automatic login portal and a URL address of the target page on the second website on which a resource requested by the client is located, so that the client visits the second automatic login link to send the visit request for the target page to the local automatic login portal.

In this implementation, the transmitting module is further configured to send a URL address of a local active login portal to the client to trigger the client to jump to a login page corresponding to the URL address of the local active login portal and use the first login account to complete active login, if the first login account is in a logged-off state.

In this implementation, the token generation rule agreed to by the second website includes a predetermined encryption algorithm and an encryption key that are stored in login domain configuration information of the second website.

The generation module is configured to obtain the predetermined encryption algorithm and the encryption key from the login domain configuration information of the second website and perform calculation on a token generation parameter agreed to by the second website, based on the obtained predetermined encryption algorithm and the obtained encryption key, to generate a random character string that is used as the automatic login token.

The token generation parameter includes one or a combination of the following content: the first login account, a login domain name of the first website, and a generation time of the automatic login token.

The present application further provides an automatic login device among multiple websites, the device is applied to a server of a second website and the device includes the following: a second query module, configured to query a login status of a second login account bound to a user's first login account on a first website when a visit request for a local target page is received from a user-side client of the first website, where the visit request includes an automatic login token generated by a server of the first website based on an appointed token generation rule; a validation module, configured to validate the automatic login token based on a token validation rule agreed to by the first website, if the second login account is in a logged-off state; and an authorization module, configured to authorize the client to perform automatic login locally by using the second login account when the automatic login token is validated, and send page data of the target page to the client after successful login to trigger the client to jump to the target page.

In this implementation, the authorization module is further configured to send the page data of the target page to the client to trigger the client to jump to the target page, if the second login account is in a logged-in state.

In this implementation, the validation module is further configured to send a URL address of a local active login portal to the client to trigger the client to jump to a login page corresponding to the URL address of the local active login portal and use the second login account to complete active login, when the automatic login token fails to be validated.

In this implementation, the token generation rule agreed to by the first website includes a predetermined decryption algorithm and an encryption key that are stored in local login domain configuration information. The validation module is configured to obtain the predetermined decryption algorithm and the encryption key from the local login domain configuration information, decrypt the automatic login token based on the obtained predetermined decryption algorithm and the obtained encryption key, and validate whether a parameter generated after the decryption is a token generation parameter agreed to by the first website; and if yes, determine that the automatic login token is validated.

The token generation parameter includes one or a combination of the following content: the first login account, a login domain name of the first website, and a generation time of the automatic login token.

In the present application, when a server of a first website receives a visit request for a target page on a second website from a user-side client, if a user's first login account on the first website is in a logged-in state, the server of the first website can generate an automatic login token based on a token generation rule agreed to by the second website, and create and send a login link to the client, where the login link includes a URL address of an automatic login portal of the second website and the automatic login token. After receiving the login link, the client can visit the login link to send the visit request for the target URL address that includes the automatic login token to the automatic login portal of the second website. After receiving the visit request, a server of the second website validates the automatic login token in the visit request if a second login account bound to the first login account is in a logged-off state. After the validation succeeds, the server of the second website authorizes the client to perform the automatic login locally by using the second login account, and send page data corresponding to the target URL address to the client after successfully logging in, to trigger the client to jump to the target page corresponding to the target URL address. In the present application, the user can directly jump to the target page on the second website when visiting the target page on the second website, by using the client of the first website without manually entering the second login account and the password on the second website to perform manual login, thereby reducing operation complexity and improving user experience.

DESCRIPTION OF IMPLEMENTATIONS

In the related technologies, when a user visits a target page on a second website by using a local client of a first website, the user usually needs to enter a login ID and a password of the second website to log in to the second website, and can obtain visit authorization of the target page only after successful login and then jumping to the target page, which can be quite inconvenient.

To ease the previous problem, the present application provides an automatic login method among multiple websites. When a server of a first website receives a visit request for a target page on a second website from a user-side client, if a user's first login account on the first website is in a logged-in state, the server of the first website can generate an automatic login token based on a token generation rule agreed to by the second website, and create and send a login link to the client, where the login link includes a URL address of an automatic login portal of the second website and the automatic login token. After receiving the login link, the client can visit the login link to send the visit request for the target URL address that includes the automatic login token to the automatic login portal of the second website. After receiving the visit request, a server of the second website validates the automatic login token in the visit request if a second login account bound to the first login account is in a logged-off state. After the validation succeeds, the server of the second website authorizes the client to perform automatic login locally, by using the second login account, and send page data corresponding to the target URL address to the client after successfully logging in, to trigger the client to jump to the target page corresponding to the target URL address.

In the present application, the user can directly jump to the target page on the second website when visiting the target page on the second website, by using the client of the first website without manually entering the second login account and the password on the second website to perform manual login, thereby reducing operation complexity and improving user experience.

The following describes the present application by using specific implementations and with reference to specific application scenarios.

Figure 1:
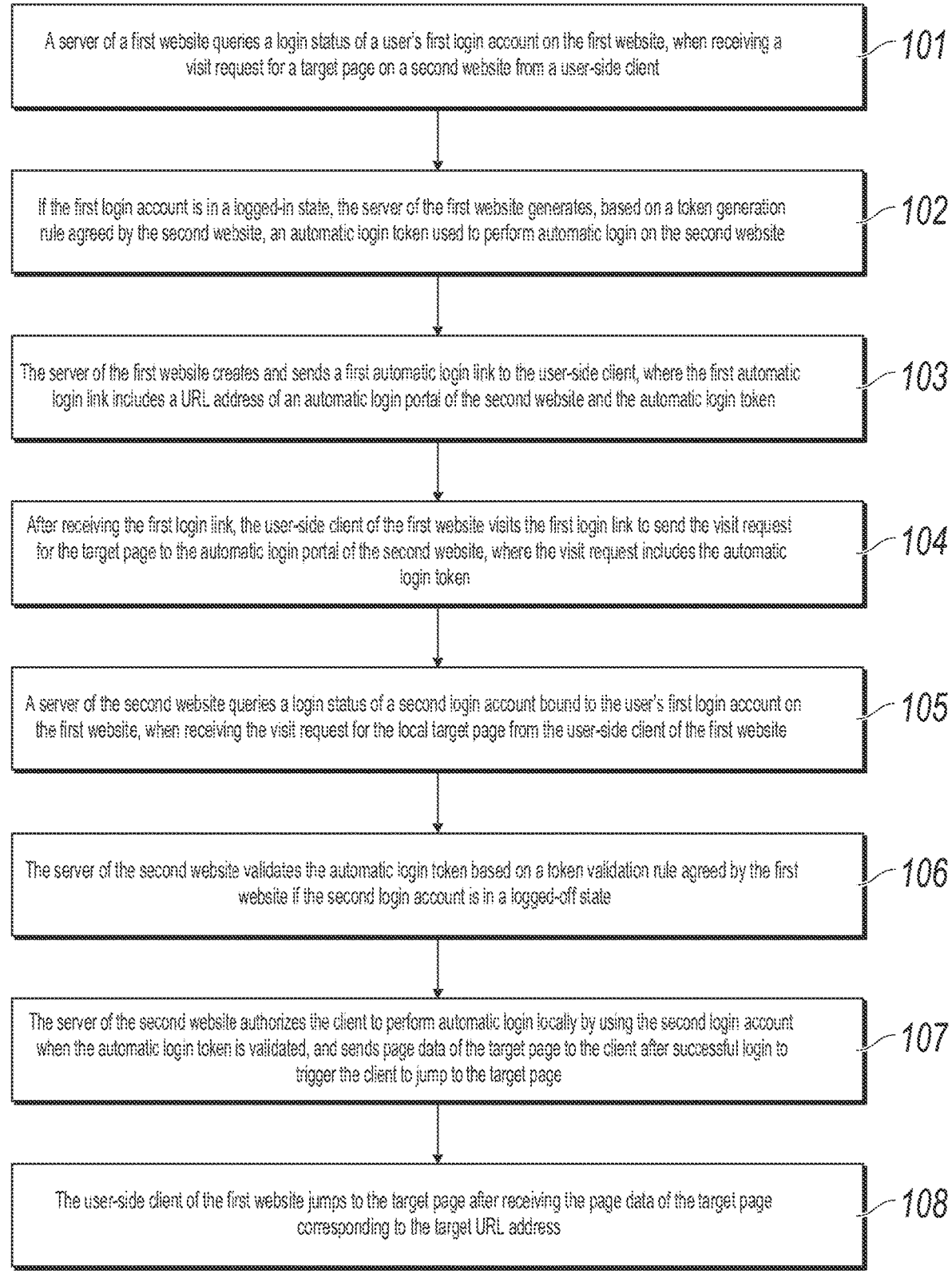
FIG. 1 is a flowchart illustrating an automatic login method among multiple websites, according to an implementation of the present application.

Referring to FIG. 1, FIG. 1 illustrates an automatic login method among multiple websites, according to an implementation of the present application. The method includes the following steps.

Step 101: A server of a first website queries a login status of a user's first login account on the first website, when receiving a visit request for a target page on a second website from a user-side client.

In this implementation, the user-side client can include a web client (for example, a browser) of the first website. A link to an automatic login portal of the first website that is used to visit a resource on the second website can be added in advance, on a user interface of the client.

The link can include a URL address of the automatic login portal of the first website, and a query parameter that needs to be transmitted to the automatic login portal of the first website when the client visits the resource on the second website.

When the user needs to use the user-side client of the first website to request to visit the resource on the second website, the user can click the link to trigger the client to send a resource visit request for the second website to the server of the first website.

After the user clicks the link, the client can generate the resource visit request based on the query parameter in the link and the user's first login account on the first website, then visit the URL address of the automatic login portal of the first website, and send the generated resource visit request to the automatic login portal on the server of the first website.

In the application scenario where the user queries the service resource on the second website by using the user-side client of the first website, the link for visiting the resource on the second website can be a service query link. The query parameter can include information such as a service identifier corresponding to the service resource that the user needs to query, and the resource visit request generated by the client can be a service query request.

For example, the first website is ALIPAY, and the second website is TAOBAO. The user needs to use the ALIPAY client to query details of a TAOBAO transaction that is paid by using ALIPAY. In this case, the resource visit request can be a service query request for the TAOBAO transaction, and the query parameter can be a transaction number of the TAOBAO transaction.

Assuming that the transaction number of the TAOBAO transaction is "20150411252031", and a URL address of an ALIPAY's automatic login portal is "http://www.alipay.com/auto_login.htm", the service query link can be http://www.alipay.com/auto_login.htm?tradeNo=20150411252031.

In the previous link, "?" is a parameter transmission identifier in the service query link, the content behind the parameter transmission identifier is a service query parameter that needs to be transmitted to ALIPAY's automatic login portal when the ALIPAY client queries the details of the TAOBAO transaction whose transaction number is 20150411252031.

The ALIPAY client can add a "View transaction details" tag in a corresponding location of the transaction on the user interface, and the tag directs towards the service query link. When the user clicks the "View transaction details" tag on the ALIPAY client, the client can obtain the transaction number (tradeNo) in the service query link, generate a service query request that includes the trade number and the user's ALIPAY account, and then visit the URL address of the ALIPAY's automatic login portal, and send the service query request to the ALIPAY's automatic login portal. The following uses the application scenario where the user queries the service resource on the second website by using the user-side client of the first website as an example for description.

In this implementation, after the server of the first website uses the automatic login portal to receive the service query request sent by the user-side client, the server of the first website can obtain the service query parameter in the service query request, and perform a corresponding service resource query in a local service database.

If the server of the first website finds the corresponding service resource in the local service database, it indicates that the service resource corresponding to the service query request is a local service resource of the first website. In this case, the server of the first website can check the login status of the first login account included in the service query request. If the first login account is in a logged-in state, it indicates that the user has logged in to the first website by using the first login account, and the server of the first website can directly return the corresponding service resource to the local client.

If no corresponding service resource is found in the local service database, it indicates that the service resource corresponding to the service query request is a non-local service resource belonging to a third-party website.

For the non-local service resource belonging to the third-party website, a mapping relationship between the service resource and a target URL address of a target page of the service resource on the third-party website is usually pre-stored on the server of the first server. The target URL address is the URL address of the target page on the second website that needs to be visited, when the user-side client of the first website queries the non-local service resource on the second website.

If the server of the first website does not find the service resource corresponding to the service query request in the local service database, the server of the first website can determine, based on the mapping relationship, the URL address of the target page on the second website corresponding to the service resource that needs to be queried, and then create and send an automatic login link (a second login link) to the client, where the automatic login link is used to perform automatic login in a login domain of the first website.

In this implementation, the login domain is a target system that the user wants to log in to. Multiple login domains can be maintained on the server of the first website. In practice, the server of the first website can interact with a server of another website (for example, a website that cooperates with the first website), and periodically synchronize respective login domain configuration information to the server of another website.

For example, assume that the first website is ALIPAY, and ALIPAY provides a third-party payment solution for the platforms such as TAOBAO and DANGDANG. The ALIPAY server can separately interact with TAOBAO and DANGDANG, and synchronize respective login domain configuration information to each other, so that the ALIPAY server can simultaneously maintain the login domain configuration information of the platforms such as TAOBAO and DANGDANG.

In this implementation, the automatic login link that is created and sent by the server of the first website to the client to perform automatic login in the login domain of the first website can include the URL address of the automatic login portal of the first website, the URL address of the target page on the second website on which the service resource to be visited by the user is located, and the service query parameter that needs to be transmitted to the automatic login portal of the first website when the client visits the URL address of the target page on the second website.

In an implementation, when the client visits the target page on the second website, the service query parameter that needs to be transmitted to the automatic login portal of the first website can include a login domain name of the service request source, the URL address of the target page on the second website, a login domain name of the second website, and information such as the first login account used when the user logs in to the first website.

After receiving the automatic login link sent by the server of the first website, the client can generate a visit request for the URL address of the target page on the second website based on the server query parameter included in the automatic login link, then visit the URL address of the automatic login portal of the first website, and send the generated visit request for the URL address of the target page on the second website to the automatic login portal of the first website. The parameter included in the generated visit request is the same as the service query parameter included in the automatic login link.

For example, the first website is ALIPAY, the second website is TAOBAO, and the user needs to use the ALIPAY client to query details of a TAOBAO transaction that is paid by using ALIPAY. Assuming a URL address of an ALIPAY's automatic login portal is http://www.ALIPAY.com/auto_login.htm, a URL address of a TAOBAO's target page that the user needs to visit is www.TAOBAO.com/trade/list.htm, and an automatic login link that is created and sent by the ALIPAY server to the ALIPAY client to perform automatic login in a login domain of ALIPAY can be: http://www.alipay.com/auto_login.htm?loginRequestFrom=Alipay&target=http%3A%2F%2Ftaobao.com%2Ftrade%2Flist.htm&domain=taobao&loginAccount=test_123@alipay.com.

In the automatic login link, "?" is a parameter transmission identifier in the automatic login link, the content behind the parameter transmission identifier is the service query parameter that needs to be transmitted to the ALIPAY's automatic login portal, when the ALIPAY client visits the TAOBAO's target URL address.

The parameter "loginRequestFrom=Alipay" indicates that a visit request generated by the Alipay client based on the parameter is from the login domain of Alipay; "loginAccount=test_123@alipay.com" indicates that a name of an ALIPAY account used by the user to log in to the payment system is test_123@alipay.com; "target=http%3A%2F%2Fae.com%2Ftrade%2Flist.htm" is the URL address of the TAOBAO's target page visited by the ALIPAY client; and "domain=taobao" indicates that a name of a peer login domain connected to the ALIPAY system is TAOBAO.

After receiving the automatic login link sent by the ALIPAY server, the ALIPAY client can generate a visit request for the target URL address of the second website based on the service query parameter included in the automatic login link, visit the URL address of the ALIPAY's automatic login portal, and send the visit request to the ALIPAY server.

In this implementation, when the server of the first website receives the visit request for the URL address of the target page on the second website from the local client by using the local automatic login portal, because the destination end of the visit request is the local automatic login portal, the local client needs to log in to the login domain of the first website by using the first login account to obtain visit authorization for the target URL address of the second website.

In this case, after receiving the visit request for the URL address of the target page on the second website from the client, the server of the first website can obtain the first login account from the visit request, and then locally queries the login status of the first login account.

For example, during implementation, the server of the first website can use the first login account as a query index to query whether a login success validation result corresponding to the first login account is stored locally. If the login success validation result of the first login account is not stored locally, it can be determined that the first login account is in a logged-off state; if the login success validation result corresponding to the first login account is found, it can be determined that the first login account is in a logged-in state.

Step 102: If the first login account is in a logged-in state, the server of the first website generates, based on a token generation rule agreed to by the second website, an automatic login token used to perform automatic login on the second website.

In this implementation, if the server of the first website finds that the first login account is in a logged-in state, it indicates that the user has logged in to the system of the first website by using the first login account. In this case, the server of the first website can generate the automatic login token (Token) based on the token generation rule agreed to by the second website.

The automatic login token is used to share a login success validation result between login domains of different websites. The server of the first website can send the generated automatic login token to a server of the second website, and share the validation result of successful login to the login domain of the first website with the second website.

In an implementation, the token generation rule agreed to between the first website and the second website can be used as login domain configuration information, and is prestored in login domain configuration information of the second website that is locally maintained on the server of the first website.

The login domain configuration information usually includes an URL address of an active login portal of the login domain and an URL address of an automatic login portal, and the token generation rule can include an appointed encryption algorithm and an encryption key. Therefore, if the token generation rule agreed to between the websites is also stored in the login domain configuration information, the login domain configuration information can include information such as the encryption algorithm agreed between the websites, the encryption key, and an encryption key acquisition method in addition to the URL address of the active login portal of the login domain and the URL address of the automatic login portal.

It is worthwhile to note that the encryption algorithm agreed to between the first website and the second website for generating the automatic login token is not limited to this implementation. For example, the predetermined encryption algorithm can include the DSA algorithm, the RSA algorithm, the MD5 algorithm, or other symmetric encryption algorithms.

When generating the automatic login token based on the token generation rule agreed to by the second website, the server of the first website can obtain the encryption algorithm and the encryption key from the login domain configuration information of the second website, perform calculation on a token generation parameter agreed to by the second website, based on the obtained encryption algorithm and the obtained encryption key, to generate a random character string, and then store the generated random character string as the automatic login token.

In an implementation, the token generation parameter can include one or a combination of information such as the first login account, a login domain name of the first website and a generation time of the automatic login token. In this implementation, when the automatic login token is generated, the token generation parameter can be information that is completely irrelevant to the user's second login account on the second website.

Certainly, in practice, the token generation parameter can include other types of information in addition to the first login account, the login domain name of the first website, and the generation time of the automatic login token, and details that are omitted in this implementation.

In this implementation, if the server of the first website finds that the first login account is in a logged-off state, it indicates that the user has not logged in to the system of the first website by using the first login account. In this case, the server of the first website can send the URL address of the local active login portal to the local client.

When receiving the URL address of the active login portal, the client can visit the URL address, jump to a login page corresponding to the URL address, and then manually enter the first login account and the corresponding login password on the login page to perform active login.

Step 103: The server of the first website creates and sends a first automatic login link to the user-side client, where the first automatic login link includes an URL address of an automatic login portal of the second website and the automatic login token.

Step 104: After receiving the first login link, the user-side client of the first website visits the first login link to send the visit request for the target page to the automatic login portal of the second website, where the visit request includes the automatic login token.

In this implementation, when determining that the first login account is in a logged-in state and generates the automatic login token, the server of the first website can create and send an automatic login link (the first login link) to the user-side client to perform automatic login in the login domain of the second website, so as to redirect the visit request of the local client for the target page on the second website to the automatic login portal of the second website.

The automatic login link that is created and sent by the server of the first website to the user-side client to perform automatic login in the login domain of the second website can include the URL address of the automatic login portal of the second website, the generated automatic login token, and the service query parameter that needs to be transmitted to the automatic login portal of the second website when the client visits the URL address of the target page on the second website.

In an implementation, when the client visits the target page on the second website, the service query parameter that needs to be transmitted to the automatic login portal of the second website can include the login domain name of the service request source, the URL address of the target page on the second website, the user's first login account used for logging in to the first website, the automatic login token generated by the server of the first website, and the generation time of the automatic login token (used by the server of the second website to validate the automatic login token).

After receiving the automatic login link sent by the server of the first website, the client can generate the visit request for the target URL address of the second website based on the service query parameter included in the automatic login link, then visit the URL address of the automatic login portal of the second website, and redirect the generated visit request for the URL address of the target page on the second website to the automatic login portal of the second website. The parameter included in the generated visit request is the same as the service query parameter included in the automatic login link.

For example, the first website is ALIPAY, the second website is TAOBAO, and the user needs to use the ALIPAY client to query details of a TAOBAO transaction that is paid by using ALIPAY. Assume a URL address of a TAOBAO's automatic login portal is http://www.taobao.com/auto_login.htm, a URL address of a TAOBAO's target page that the user needs to visit is www.taobao.com/trade/list.htm, and an automatic login link that is created and sent by the ALIPAY server to the ALIPAY client and that is used to perform automatic login in a login domain of TAOBAO can be http://www.taobao.com/auto_login.htm?loginRequest-From= Alipay&target=http%3A%2F%2Ftaobao.com%2Ftrade%2Flist.htm&domain=taobao&loginAccount=test_123@alipay.com&token=4320853204983208411fjkdsljfdsj&tokentime=201504111104.

The parameter "loginRequestFrom=Alipay" indicates that a visit request generated by the ALIPAY client based on the parameter is from a login domain of ALIPAY; "loginAccount=test_123@alipay.com" indicates that a name of an ALIPAY account used by the user to log in to the payment system is test_123@alipay.com; "target=http%3A%2F%2Fae.com%2Ftrade%2Flist.htm" is the encoded URL address of the TAOBAO's target page visited by the ALIPAY client; "domain=alipay" indicates that a name of a peer login domain connected to the TAOBAO system is ALIPAY; "token=4320853204983208411fjkdsljfdsj" indicates an automatic login token generated on the ALIPAY server; and "tokentime=201504111104" indicates a generation time of the automatic login token.

After receiving the automatic login link sent by the ALIPAY server, the ALIPAY client can generate a visit request for the URL address of the TAOBAO's target page based on the service query parameter included in the automatic login link. Then the ALIPAY client can visit the URL address of the TAOBAO's automatic login portal, and send the visit request to the TAOBAO server.

Step 105: A server of the second website queries a login status of a second login account bound to the user's first login account on the first website, when receiving the visit request for the local target page from the user-side client of the first website.

In this implementation, the user logs into the first login account of the first website, and the first login account can be bound in advance to the second login account for the user to log in to the second website. The binding relationship can be separately prestored on the server of the first website and the server of the second website.

For example, the first website is ALIPAY, and the second website is TAOBAO. Assume that the first login account is a user's ALIPAY account test_123@alipay.com for logging in to the ALIPAY system, and the second login account is a user's TAOBAO account test_123@taobao.com for logging in to the TAOBAO system. In this case, the ALIPAY server and the TAOBAO server can separately store a binding relationship between test_123@alipay.com and test_123@taobao.com.

When receiving the visit request for the URL address of the local target page from the local client of the first website, the server of the second website can obtain the first login account from the visit request, and query the second login account bound to the first login account based on the established binding relationship. When finding the second login account bound to the first login account, the server of the second website can locally query the login status of the second login account.

Step 106: The server of the second website validates the automatic login token based on a token validation rule agreed to by the first website if the second login account is in a logged-off state.

In this implementation, if the server of the second website finds that the second login account is in a logged-off state, the server can obtain the automatic login token included in the visit request, and validate the automatic login token based on the token validation rule agreed to by the first website.

The token validation rule agreed between the second website and the first website corresponds to the token generation rule used when the first website generates the automatic login token.

In this implementation, the token validation rule can still be used as the login domain configuration information, and is prestored in the login domain configuration information of the second website. The token validation rule can include an appointed encryption algorithm and an encryption key, where the encryption algorithm and the encryption key that are used as the token validation rule need to be the same as the encryption algorithm and the encryption key that are used when the server of the first website generates the automatic login token.

When validating the automatic login token, the server of the second website can obtain the encryption algorithm and the encryption key from the local login domain configuration information, and perform reverse decryption calculation on the automatic login token based on the obtained encryption algorithm and the obtained encryption key to obtain several parameters. Then the server of the second website can validate the parameters obtained through validation decryption, and determine whether the parameters are the same as the token generation parameters that are agreed to by the first website and that are used to generate the automatic login token.

For example, when the server of the first website generates the automatic login token, the token generation parameter includes information such as the first login account, the login domain name of the first website, and the generation time of the automatic login token (the token generation parameter can be included in the visit request sent by the client). When validating the automatic login token, the server of the second website can perform reverse decryption on the automatic login token based on the same algorithm and the same encryption key to obtain several parameters. Then the server of the second website can compare the parameters obtained through reverse decryption with the token generation parameters used by the server of the first website for generating the automatic login token. When all the information such as the first login account, the login domain name of the first website, and the generation time of the automatic login token are matched, the server of the second website determines that the automatic login token is validated. Otherwise, if any parameter in the previous parameters does not match, the server of the second website can determine that the automatic login token fails to be validated.

Step 107: The server of the second website authorizes the client to perform automatic login locally by using the second login account when the automatic login token is validated, and sends page data of the target page to the client after successful login to trigger the client to jump to the target page.

In this implementation, if the server of the second website validates the automatic login token, the server of the second website can directly confirm, in the local login domain, that the first login account successfully logs in to the login domain of the first website. That is, the server of the second website can determine, by validating the automatic login token, whether the login result of the user on the first website can be directly shared in the login domain of the second website.

In this case, the server of the second website can perform login authorization on the second login account in the login domain of the second website, and authorize the client to perform automatic login in the login domain of the second website by using the second login account bound to the first login account. In the entire process, the server of the second website does not need to perform any form of login validation on the second login account.

After the automatic login succeeds, the client has obtained the visit authorization for the target URL address on the second website, and the server of the second website can send the page data corresponding to the target URL address to the client to trigger the client to jump to the corresponding target page.

Certainly, if the automatic login token fails to be validated, the server of the second website can send the URL address of the local active login portal to the local client. When receiving the URL address of the active login portal, the client can visit the URL address, jump to the login page corresponding to the URL address, and then manually enter the second login account and the corresponding login password on the login page to perform active login.

Step 108: The user-side client of the first website jumps to the target page after receiving the page data of the target page.

In this implementation, after receiving the page data that is sent by the server of the second website and that is corresponding to the target URL address, the user-side client of the first website can load the received page data in the browser, and then jump to the target page corresponding to the target URL address.

In this case, the user completes visit to the target page on the second website by using the user-side client of the first website. In the entire process, when visiting the target page on the second website, the user-side client of the first website needs to validate whether the user successfully logs in to the first website by using the first login account. If the user has logged in to the first website by using the first login account, the automatic login token can be generated to share the validation result of user's successful login to the first website with the second website. After the second website validates the automatic login token, automatic login is performed by using the second login account bound to the first login account. No other form of authentication needs to be performed on the second login account in the entire login process.

In the previously described implementation, when the user visits the target page on the second website by using the user-side client of the first website, if the user's first login account on the first website has logged in to the login domain of the first website, the server of the first website can generate the automatic login token based on the token generation rule agreed to by the server of the second website, send the automatic login token to the server of the second website, and share the validation result that the first login account successfully logs in to the login domain of the first website with the second website.

The server of the second website can validate the automatic login token. The server can directly authorize the client to log in to the login domain of the second website by using the second login account bound to the first login account if the validation succeeds, so that the user can directly jump to the target page by using the client without repeatedly entering the second login account and the login password on the login page to log in to the second website. Because no form of validation needs to be performed on the second login account in the entire login process, operation complexity can be reduced and user experience can be improved.

It is worthwhile to note that the previously described implementation describes a detailed process of visiting the target page on the second website by the user by using the user-side client of the first website. In practice, the user can visit a target page on the first website by using a user-side client of the second website, and details are omitted in the present application. For implementation, a person skilled in the art can refer to the descriptions of the previously described implementation.

The following describes the technical solution in the previously described implementation by using an example in which the first website is ALIPAY and the second website is TAOBAO and with reference to an application scenario that the user views TAOBAO transaction details by using the ALIPAY client.

In this example, the scenario includes a browser of the ALIPAY client, an ALIPAY server, and a TAOBAO server.

In this example, ALIPAY can be used as a third-party payment company to provide online payment for TAOBAO. In the ALIPAY's transaction history, the user can usually view transaction information of all third parties that are related to payment, and the transaction information in ALIPAY usually includes only digest information of the transaction. For example, the transaction information can include only a transaction name. Therefore, if the user needs to view the transaction details, the user needs to jump to the TAOBAO website for query.

In the related technologies, when the user jumps to the TAOBAO website by using the browser to query the transaction details, the TAOBAO system usually requires the user to enter a login account registered in TAOBAO and a login password. After successful login, the user has authorization to view the transaction details, which can be quite inconvenient.

In this example, to enable the browser to automatically jump to the target page of the transaction details when the user views the TAOBAO transaction details in the ALIPAY's transaction history, a same core component can be integrated in an ALIPAY website architecture and a TAOBAO website architecture.

Figure 2:
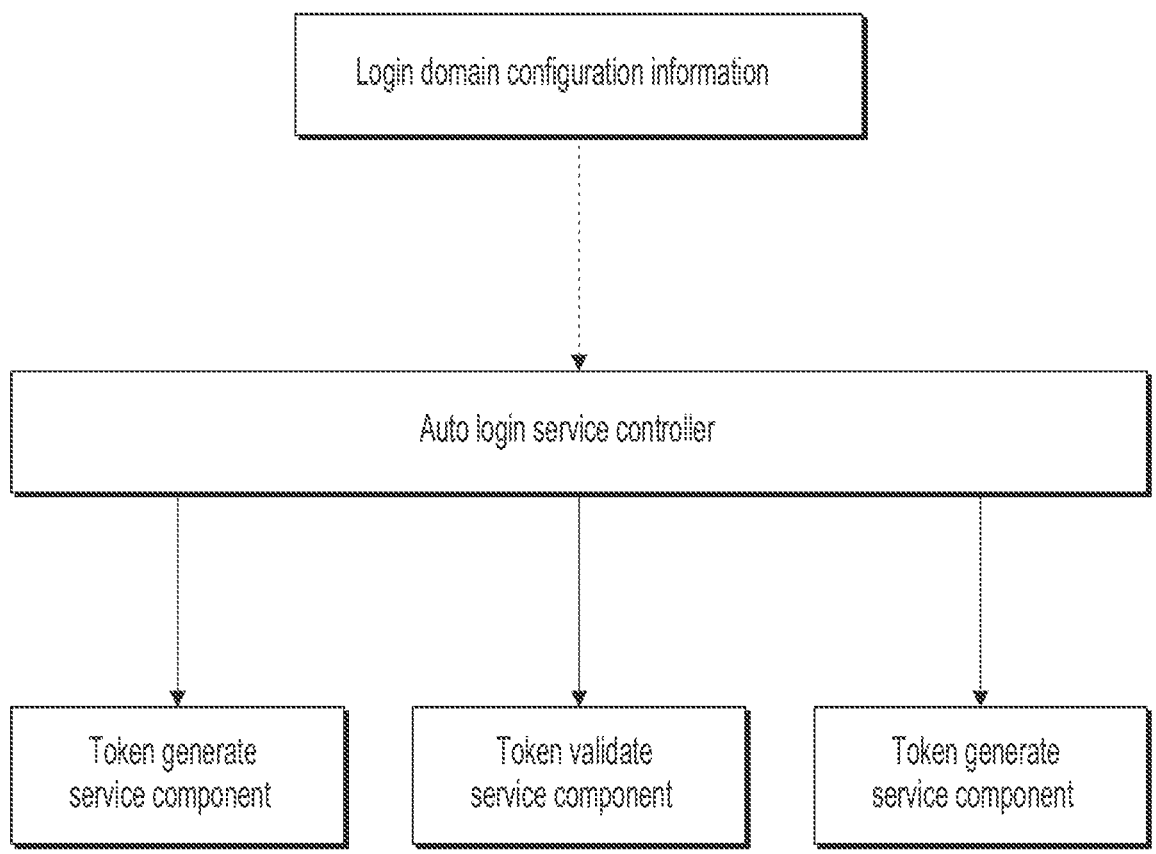
FIG. 2 is an architectural diagram illustrating a core component, according to an implementation of the present application.

Referring to FIG. 2, FIG. 2 is an architectural diagram illustrating a core component, according to an implementation of the present application.

The core component architecture shown in FIG. 2 includes an auto login service (ALS) controller, a token (automatic login token) generate service (TGS) component, a token validate service (TVS) component, a login service (LS) component, and login domain configuration information.

The auto login service controller is a main automatic login portal and is responsible for controlling all processes of automatic login. The user can visit the URL address of the automatic login portal by using the browser, access the auto service controller, and transmit a parameter to the auto login service controller to implement automatic login.

The token generation service component is running in a logged-in system, and is configured to generate a token based on a token generation rule agreed to by a peer login system. Main parameters for generating the token can include a logged-in account, a peer login domain name, and a token generation time. The token generation rule is agreed between websites, and can include symmetric encryption algorithms such as DSA, RSA, or MD5 and an encryption key.

The token validation service component is running in a system to be logged in, and is configured to validate, based on an appointed token validation rule, the token that is sent by the logged-in system. A validation method corresponds to the generation rule when the token generate service component generates the token.

The login service component is configured to check whether a login pending account currently logs in to the system, and performs automatic login for the login pending account.

The login domain configuration information is responsible for managing configuration information of each login domain, including information such as a URL address of an active login portal of each login domain, a URL address of an automatic login portal, an encryption algorithm, an encryption key, or an encryption key acquisition method.

In this implementation, assuming that a user's first login account for ALIPAY is test_123@alipay.com, and a user's second login account for TAOBAO is test_123@taobao.com, binding relationship between test_123@alipay.com and @taobao.com can be prestored on a TAOBAO server.

An ALIPAY's transaction history includes digest information of a TAOBAO transaction. In a predetermined location of the digest information, a "View transaction details" tag is added in advance, and the tag corresponds to a URL address http://www.alipay.com/auto_login.htm of an ALIPAY's automatic login portal.

When the user clicks the "View transaction details" tag to jump to a TAOBAO's transaction page and queries details of the TAOBAO transaction, the browser sends a query request for the transaction details to the ALIPAY server. After receiving the query request, and finding a URL address www.taobao.com/trade/list.htm of the TAOBAO's transaction page based on a mapping relationship, the ALIPAY server can send a first automatic login link http://www.alipay.com/
auto_login.htm?loginRequestFrom=Alipay&target=
http%3A%2F%2Ftaobao.com%2Ftrade%2Flist.htm&
domain=taobao&loginAccount=test_123@alipay.com to the browser.

After receiving the first automatic login link, the browser generates a visit request for the URL address of the TAOBAO's transaction page, visits the URL address of the ALIPAY's automatic login portal, and sends the visit request to the automatic login portal of the ALIPAY server.

In this case, information included in the visit request includes the visit request source ALIPAY, the URL address of the TAOBAO's transaction page, a login domain name of TAOBAO, and the ALIPAY account test_123@alipay.com that the user needs to log in to.

The ALS component on the ALIPAY server processes the visit request, and finds that the visit request is from the local login domain. In this case, the ALS component triggers generation of the token, and invokes the LS component to query a login status of the login account test_123@alipay.com. If the login account test_123@alipay.com is in a logged-in state, the ALS component continues to invoke the TGS component to generate the token.

After the token is generated, the ALS component obtains configuration information of a login domain of TAOBAO, and creates and sends a second automatic login link to the ALIPAY client to redirect the visit request from the ALIPAY client for the URL address of the TAOBAO's transaction page to a TAOBAO's automatic login portal.

In this case, the second automatic login link is http://www.taobao.com/auto_login.htm?loginRequestFrom=
Alipay&target=http%3A%2F%2Ftaobao.com%2Ftrade%
2Flist.htm&domain=taobao&loginAccount=test_123@
alipay.com&token=432085320498320841fjkdsljfdsj&
tokentime=201504111104.

After receiving the second automatic login link, the browser generates a visit request for the URL address of the TAOBAO's transaction page again, visits the URL address of the TAOBAO's automatic login portal, and redirects the newly-generated visit request to the TAOBAO's automatic login portal.

In this case, information included in the visit request includes the visit request source ALIPAY, the URL address of the TAOBAO's transaction page, a login domain name of ALIPAY (the peer login domain changes after the redirection), the ALIPAY account test_123@alipay.com that the user needs to log in to, the generated token, and a generation time of the token.

The ALS component on the TAOBAO server processes the visit request, and finds that the visit request is from the login domain of ALIPAY. In this case, the ALS component triggers validation of the token, and invokes the LS component to query a login status of the login account test_123@taobao.com that is bound to test_123@alipay.com. If the login account test_123@taobao.com is in a logged-in state, the ALS component continues to invoke the TVS component to validate the token.

When the token is validated, the TAOBAO system confirms that the user successfully logs in to the login domain of ALIPAY by using test_123@alipay.com. In this case, the ALS component can invoke the LS component to authorize the login account test_123@taobao.com to perform automatic login.

When the login account test_123@taobao.com automatically logs in to the login domain of TAOBAO, the TAOBAO server can send page data of the transaction page corresponding to www.TAOBAO.com/trade/list.htm to the browser of the ALIPAY client. After receiving the page data from the TAOBAO server, the browser can load the page data, and then automatically jump to the TAOBAO's transaction page to display the details of the TAOBAO transaction to the user.

In this case, the user has completed the operation of viewing the details of the TAOBAO transaction in the ALIPAY's transaction history. In the entire process, the user does not need to enter the TAOBAO login account test_123@taobao.com and the login password on the login page to log in to the login domain of TAOBAO, and the browser can automatically jump to the TAOBAO's transaction page to display the transaction details to the user.

Corresponding to the previously described method implementation, the present application further provides an apparatus implementation.

Figure 3:
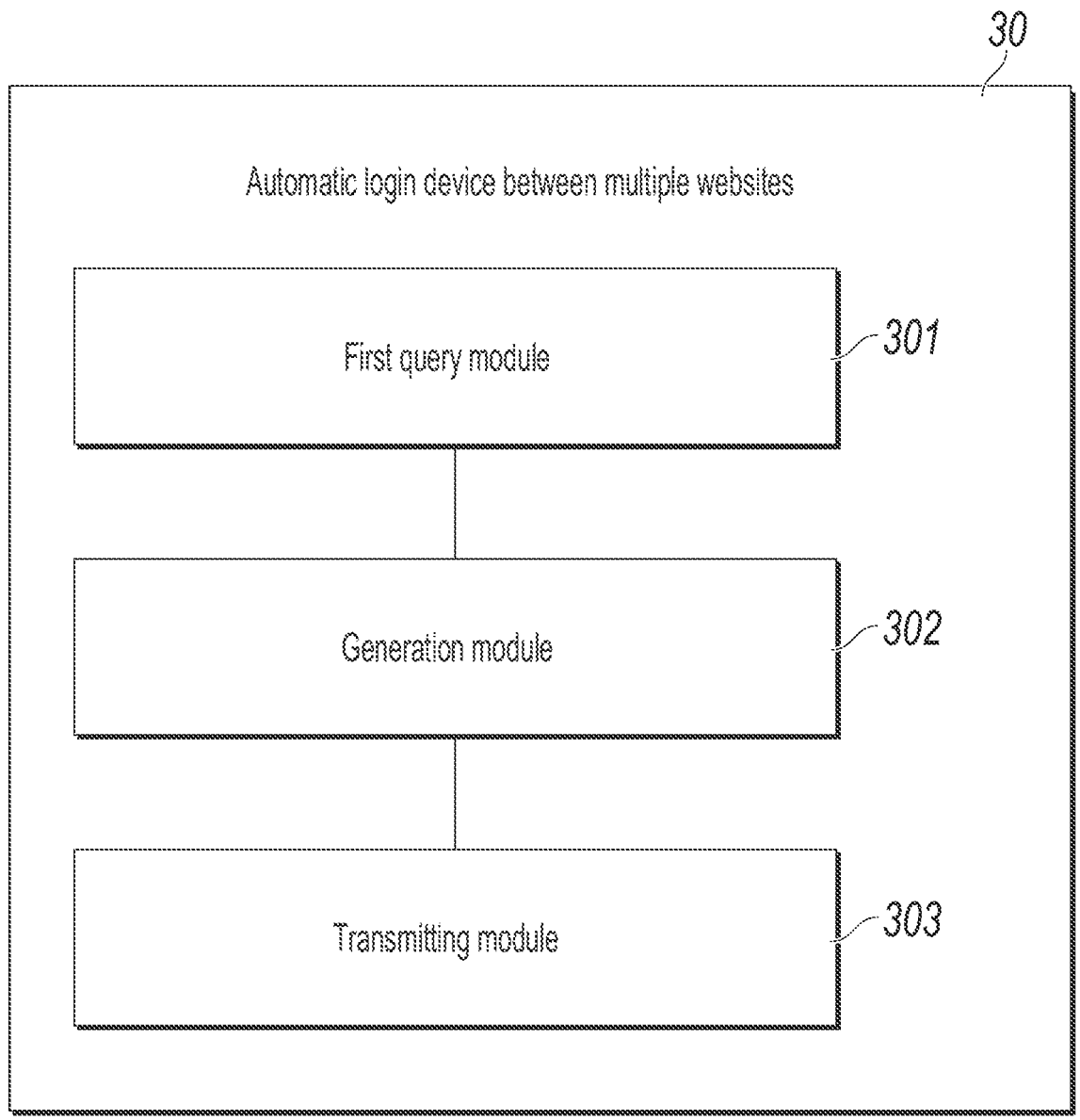
FIG. 3 is a logical block diagram illustrating an automatic login device among multiple websites, according to an implementation of the present application.
Figure 4:
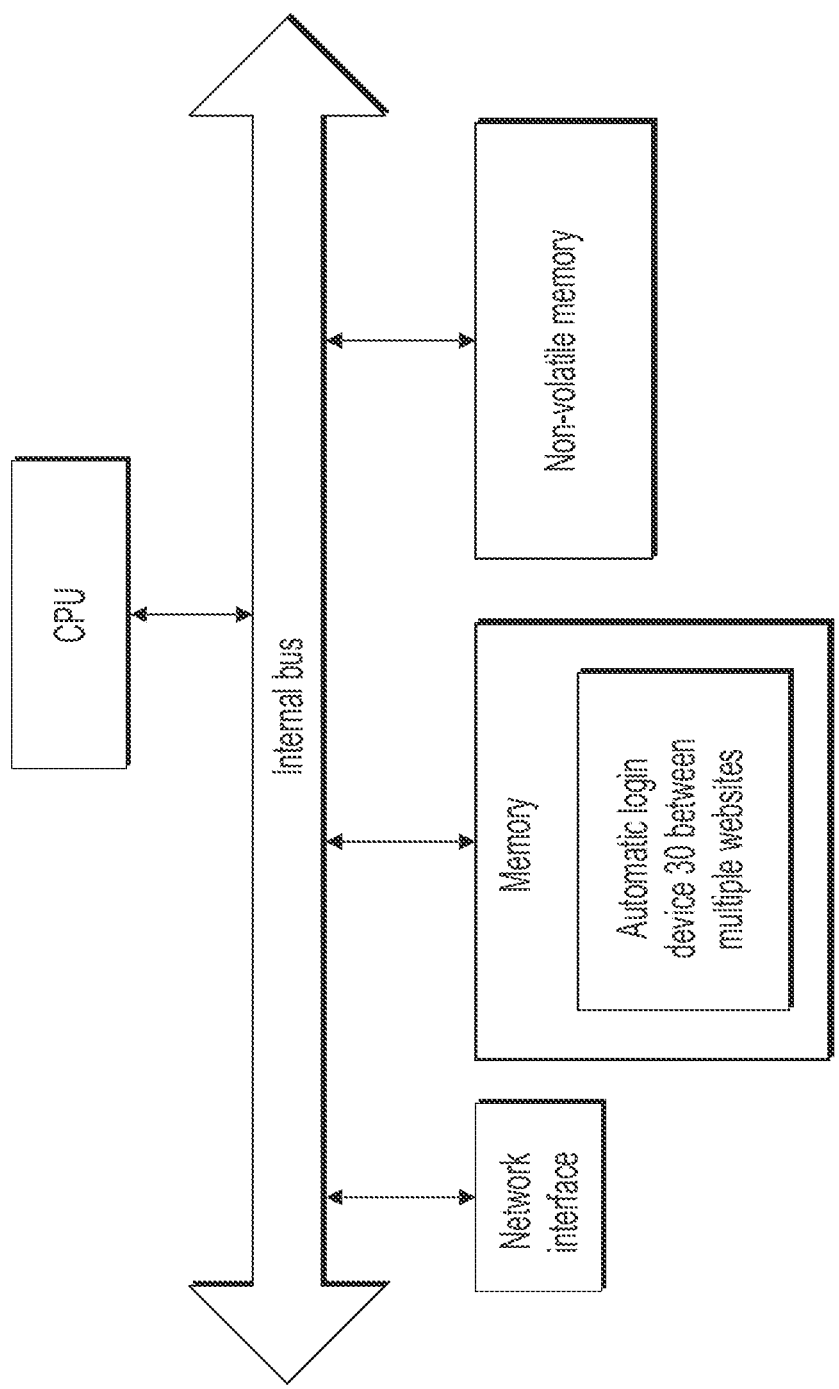
FIG. 4 is a structural diagram illustrating hardware of a server of a first website that includes an automatic login device among multiple websites, according to an implementation of the present application.

Referring to FIG. 3, the present application provides an automatic login device 30 among multiple websites, and the device is applied to a server of a first website. Referring to FIG. 4, a hardware architecture of a server that includes the automatic login device 30 generally includes a CPU, a memory, a nonvolatile memory, a network interface, an internal bus, etc. In an example in which the automatic login device 30 is implemented by software, the automatic login device 30 can be usually understood as a computer program loaded in the memory, and forms a logical software and hardware combined device after running by using the CPU. The device 30 includes the following: a first query module 301, configured to query a login status of a user's first login account on the first website, when a visit request for a target page on a second website is received from a user-side client; a generation module 302, configured to generate an automatic login token based on a token generation rule agreed to by the second website, if the first login account is in a logged-in state; and a transmitting module 303, configured to create and send a first automatic login link to the client, where the first automatic login link includes a URL address of an automatic login portal of the second website and the automatic login token, so that the client visits the first automatic login link to send the visit request for the target page that includes the automatic login token to the automatic login portal of the second website, and after validating the automatic login token, a server of the second website authorizes the client to perform automatic login on the second website by using a second login account bound to the first login account, and jump to the target page.

In this implementation, the transmitting module 303 is further configured to create and send a second automatic login link to the client when a resource visit request for the second website is received from the user-side client, where the second automatic login link includes a URL address of a local automatic login portal and a URL address of the target page on the second website on which a resource requested by the client is located, so that the client visits the second automatic login link to send the visit request for the target page to the local automatic login portal.

In this implementation, the transmitting module 303 is further configured to send a URL address of a local active login portal to the client to trigger the client to jump to a login page corresponding to the URL address of the local active login portal, and use the first login account to complete active login, if the first login account is in a logged-off state.

In this implementation, the token generation rule agreed to by the second website includes a predetermined encryption algorithm and an encryption key that are stored in login domain configuration information of the second website.

The generation module 302 is configured to obtain the predetermined encryption algorithm and the encryption key from the login domain configuration information of the second website; and perform calculation on a token generation parameter agreed to by the second website, based on the obtained predetermined encryption algorithm and the obtained encryption key, to generate a random character string that is used as the automatic login token.

The token generation parameter includes one or a combination of the following content: the first login account, a login domain name of the second website, and a generation time of the automatic login token.

Figure 5:
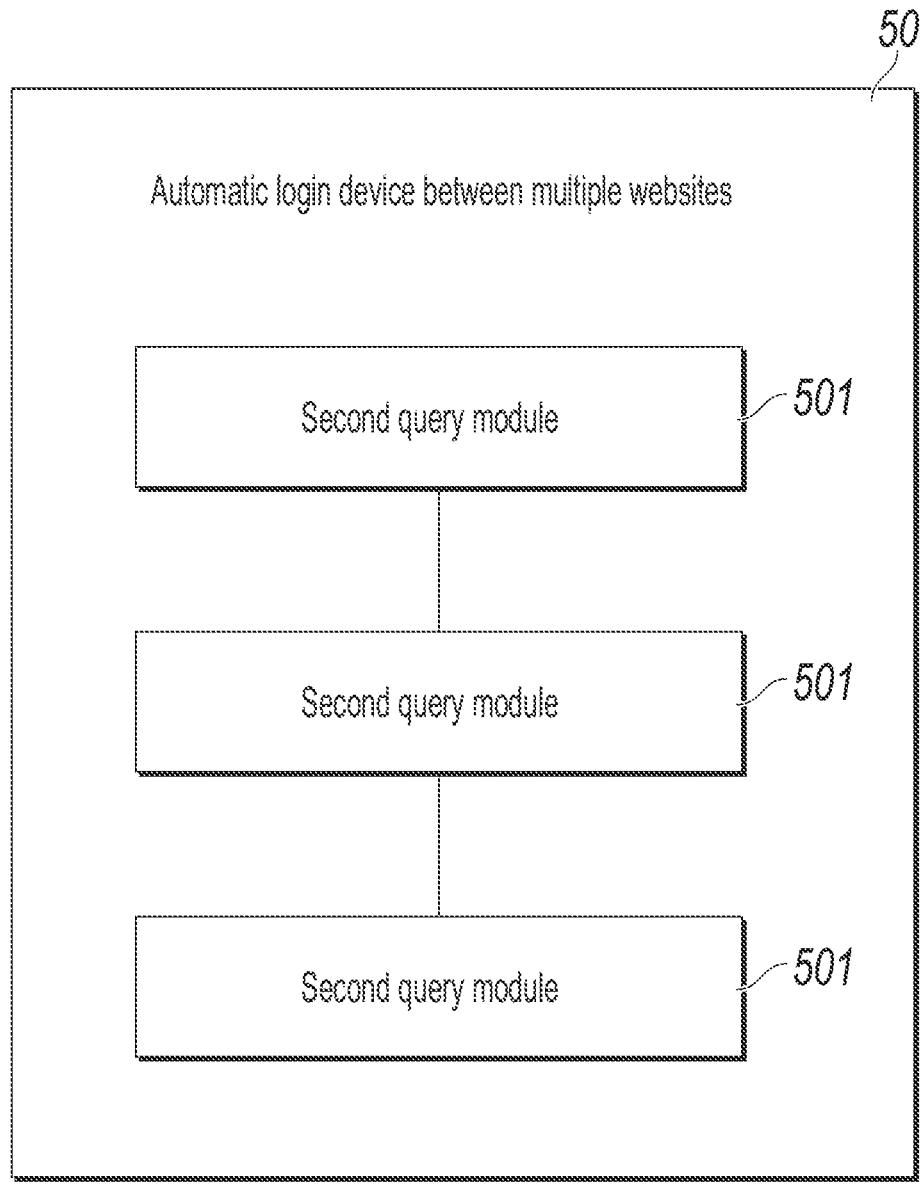
FIG. 5 is a logical block diagram illustrating another automatic login device among multiple websites, according to an implementation of the present application.
Figure 6:
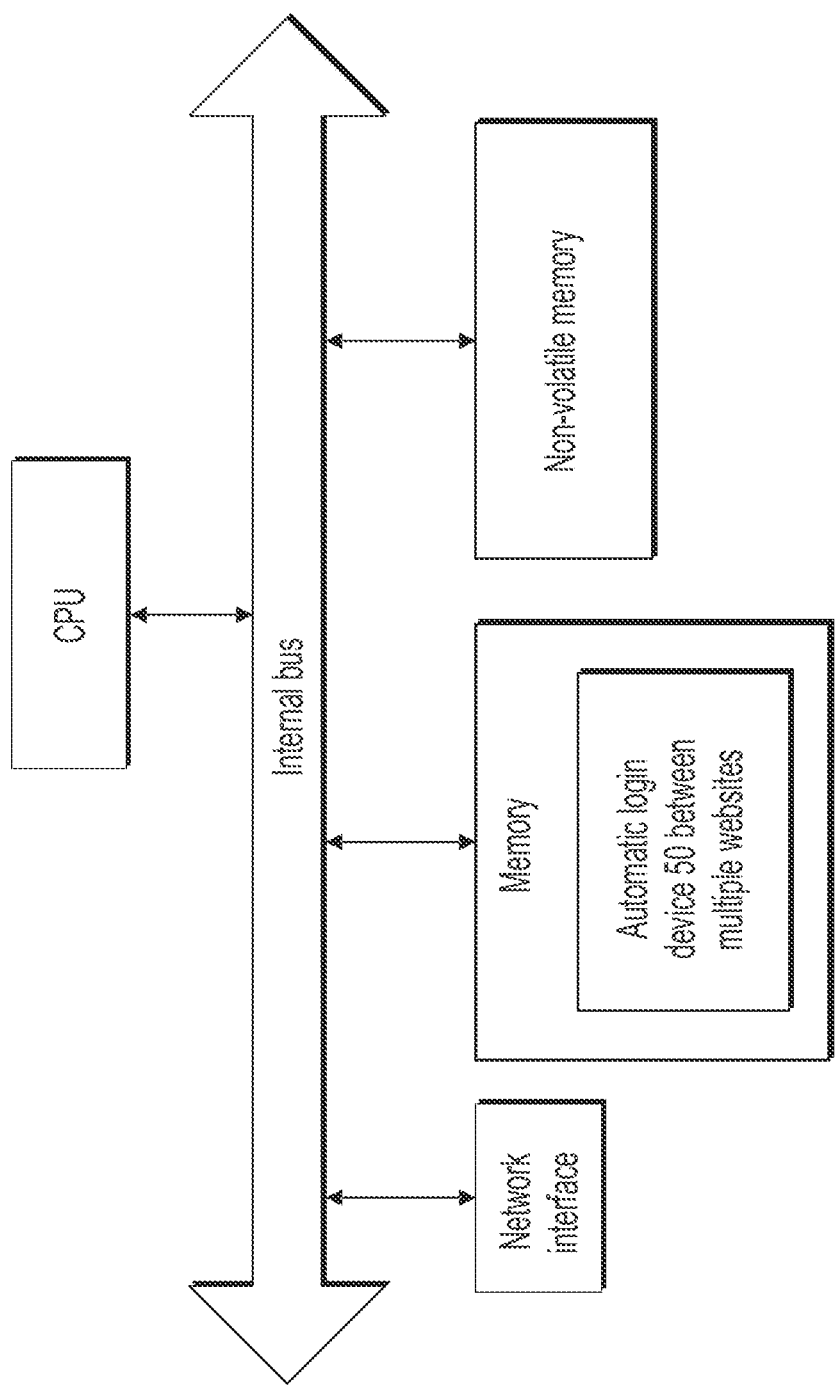
FIG. 6 is a structural diagram illustrating hardware of a server of a second website that includes another automatic login device among multiple websites, according to an implementation of the present application.

Referring to FIG. 5, the present application provides another automatic login device 50, and the device is applied to a server of a second website. Referring to FIG. 6, a hardware architecture of a server that includes the automatic login device 50 generally includes a CPU, a memory, a nonvolatile memory, a network interface, an internal bus, etc. In an example in which the automatic login device 50 is implemented by software, the automatic login device 50 can be usually understood as a computer program loaded in the memory, and forms a logical software and hardware combined device after being processed by the CPU. The device 50 includes the following: a second query module 501, configured to query a login status of a second login account bound to a user's first login account on a first website when a visit request for a local target page is received from a user-side client of the first website, where the visit request includes an automatic login token generated by a server of the first website based on an appointed token generation rule; a validation module 502, configured to validate the automatic login token based on a token validation rule agreed to by the first website if the second login account is in a logged-off state; and an authorization module 503, configured to authorize the client to perform automatic login locally by using the second login account when the automatic login token is validated, and send page data of the target page to the client after successful login to trigger the client to jump to the target page.

In this implementation, the authorization module 503 is further configured to send the page data of the target page to the client to trigger the client to jump to the target page, if the second login account is in a logged-in state.

In this implementation, the validation module 502 is further configured to send a URL address of a local active login portal to the client to trigger the client to jump to a login page corresponding to the URL address of the local active login portal and use the second login account to complete active login, when the automatic login token fails to be validated.

In this implementation, the token generation rule agreed to by the first website includes a predetermined decryption algorithm and an encryption key that are stored in local login domain configuration information.

The validation module 502 is configured to obtain the predetermined decryption algorithm and the encryption key from the local login domain configuration information, decrypt the automatic login token based on the obtained predetermined decryption algorithm and the obtained encryption key, and validate whether a parameter generated after the decryption is a token generation parameter agreed to by the first website, and if yes, determine that the automatic login token is validated.

The token generation parameter includes one or a combination of the following content: the first login account, a local login domain name, and a generation time of the automatic login token.

A person skilled in the art can easily figure out another implementation solution of the present application after considering the specification and practicing the present application. The present application is intended to cover any variations, functions, or adaptive changes of the present application. These variations, functions, or adaptive changes comply with general principles of the present application, and include common knowledge or a commonly used technical means in the technical field that is not disclosed in the present application. The specification and the implementations are merely considered as examples, and the actual scope and the spirit of the present application are described by the following claims.

It should be understood that the present application is not limited to the accurate structures that are described above and that are shown in the accompanying drawings, and modifications and changes can be made without departing from the scope of the present application. The scope of the present application is limited only by the appended claims.

The previous descriptions are merely preferred implementations of the present application, but are not intended to limit the present application. Any modification, equivalent replacement, or improvement made without departing from the spirit and principle of the present application shall fall within the protection scope of the present application.

Figure 7:
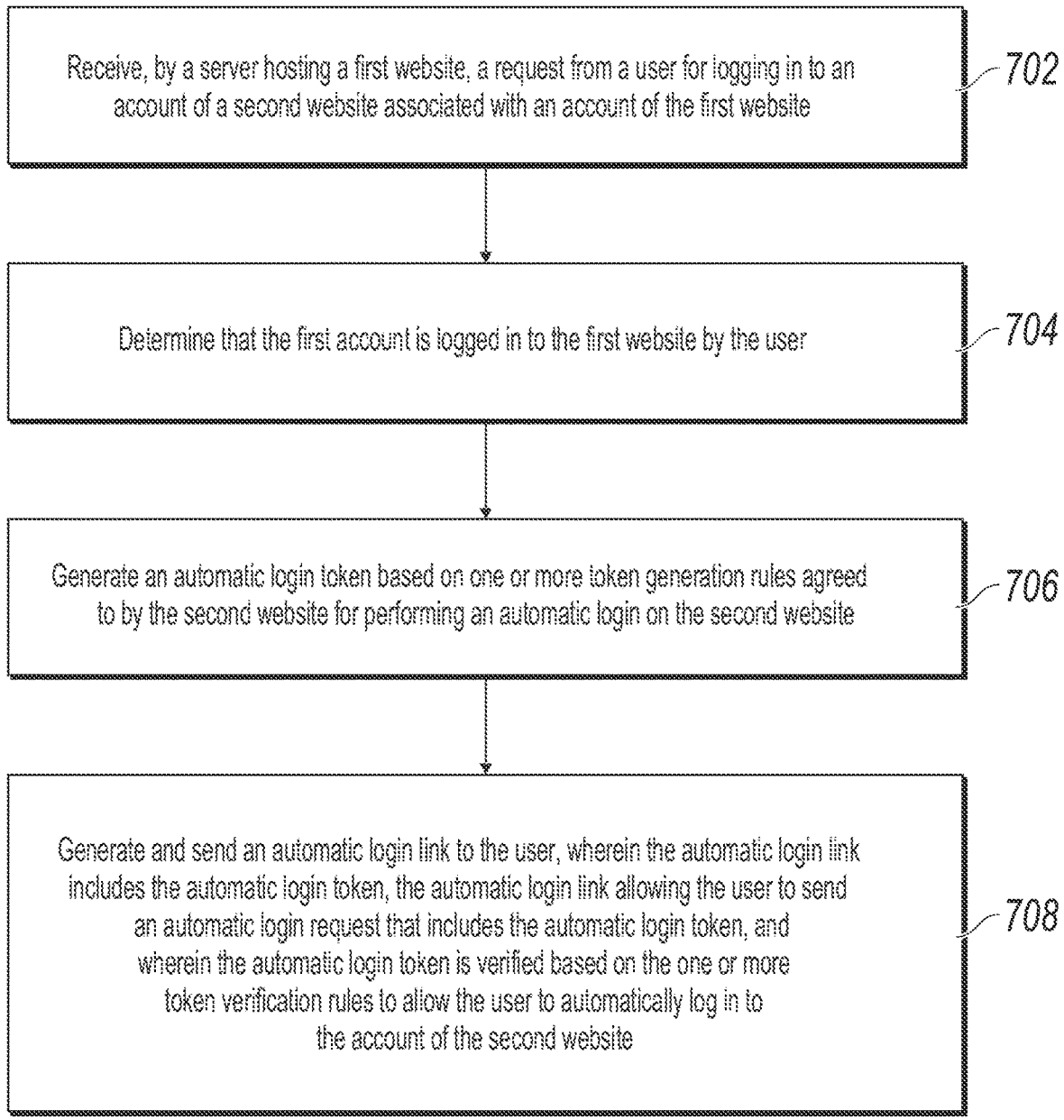
FIG. 7 is a flowchart illustrating an example of a computer-implemented method 700 for automatic account login among different websites, according to an implementation of the present disclosure.

FIG. 7 is a flowchart illustrating an example of a computer-implemented method 700 for automatic account login between different websites, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, a request from a user for logging in to an account of a second website associated with an account of a first website is received by a server hosting the first website. From 702, method 700 proceeds to 704.

At 704, the account of the first website is determined to be logged in to by the user. From 704, method 700 proceeds to 706.

At 706, an automatic login token is generated based on one or more token generation rules agreed to by the second website for performing automatic login on the second website. In some implementations, the one or more token generation rules include a predetermined encryption algorithm and an encryption key that are stored in configuration information of a login domain of the second website. The predetermined encryption algorithm can be agreed upon by the first website and the second website.

When generating the automatic login token based on the token generation rule agreed to by the second website, the server of the first website can obtain the encryption algorithm and the encryption key from the login domain configuration information of the second website. One or more token generation parameters agreed to by the second website can be calculated to generate a random character string based on the predetermined encryption algorithm and the encryption key. The generated random character string can then be stored as the automatic login token. In some implementations, the automatic login token is generated based on the one or more token generation parameters encrypted by the encryption key using the predetermined encryption algorithm. From 706, method 700 proceeds to 708.

At 708, an automatic login link is generated and sent to the user. In some implementations, the automatic login link includes the automatic login token. In some implementations, the automatic login link allows the user to send an automatic login request that includes the automatic login token. In some implementations, the automatic login token is verified based on the one or more token verification rules to allow the user to automatically log in to the account of the second website. In some implementations, before the second website verifies the automatic login token, whether the second account is logged in is determined. The second website verifies the automatic login token after it is determined that the second account is not logged in to by the user.

In some implementations, the token generation parameter includes at least one of the account of the first website, a login domain name of the first website, and a time the automatic login token is generated. In some implementations, the automatic login link includes a URL address. In some implementations, the URL address includes a URL field of a target page that directs the user to the target page of a second account after the second account is automatically logged in. For example, the account of the first website can be an ALIPAY account and the second account can be a TAOBAO account. Assuming that the user wants to verify a particular TAOBAO transaction through ALIPAY, an example automatic login link can be expressed as http://www.alipay.com/auto_login.htm?loginRequestFrom=Alipay&target=http%3A%2F%2Ftao bao.com%2Ftrade%2Flist.htm&domain=taobao&loginAccount=test_123@alipay.com.

In the automatic login link, "?" is a parameter transmission identifier, the field behind the parameter transmission identifier is the service query parameter to be transmitted to ALIPAY's automatic login portal for a user to visit TAOBAO account's target URL address through an ALIPAY account; "loginRequestFrom=Alipay" indicates that a visit request is initiated from the ALIPAY account based on token generation parameters from the login domain of ALIPAY; "loginAccount=test_123@alipay.com" indicates that the ALIPAY account used by the user to log in to the payment system is test_123@alipay.com; "target=http%3A%2F%2Fae.com%2Ftrade%2Flist.htm" is the URL address of the TAOBAO account's target page visited by the ALIPAY account; and "domain=taobao" indicates that a name of a peer login domain connected to the ALIPAY system is TAOBAO. After 708, method 700 stops.

Embodiments of the subject matter described in this specification can be implemented so as to realize particular advantages or technical effects. For example, implementations of the subject matter permit a server of a first user account to provide an authenticated user a link to quickly and securely log in to a second user account associated with the first user account. As such, the user does not need to provide additional identity information to log on to the second account. User operations can then be simplified and user experience can be improved.

The described methodology permits enhancement of account/data security of various mobile computing device. An encryption algorithm stored in a login domain agreed to by both accounts can be used to encrypt an automatic login token. The user can be directed to a target page of the second account only after the automatic login token is verified by one or more token verification rules. As such, the account servers can have more control on security of the account redirecting process.

The described methodology can ensure the efficient usage of computer resources (for example, processing cycles, network bandwidth, and memory usage), through the efficient redirecting and login to associated user accounts. At least these actions can minimize or prevent waste of available computer and network resources with respect to multiple associated mobile services by reducing bandwidth occupancy between the mobile computing device and the server. Instead of the mobile computing device needing to provide additional identity information to the server for authentication. The account operations can be more quickly and securely made through simpler user-server interactions.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, by a server of a second website, a visit request from a client device for logging in to an account of the second web site, wherein the visit request is generated by the client device visiting an automatic login link generated by a server of a first web site, wherein the visit request includes an automatic login token generated by the server of the first website based on one or more token generation rules agreed to by the second website for performing an automatic login on the second website, wherein the one or more token generation rules include a predetermined encryption algorithm and an encryption key that are stored in configuration information of a login domain of the second website, and wherein generating, by the server of the first website, the automatic login token comprises:
      obtaining the predetermined encryption algorithm and the encryption key from the configuration information of the login domain of the second website; and
      generating the automatic login token based on one or more token generation parameters encrypted by the encryption key using the predetermined encryption algorithm;
   querying, by the server of the second web site, a login status of the account of the second website associated with an account of the first website;
   determining, by the server of the second web site, that the account of the second web site is in a logged-off state;
   in response, validating, by the server of the second website, the automatic login token based on one or more token validation rules agreed to by the first website; and
   in response to validating the automatic login token, authorizing, by the server of the second website, the client device to automatically log in to the account of the second website.

2. The computer-implemented method of claim 1, wherein the automatic login link includes a uniform resource locator (URL) address that includes an URL field of a target page, the URL address directing the client device to the target page after the client device automatically logs in to the second website with the account of the second website.

3. The computer-implemented method of claim 1, wherein the predetermined encryption algorithm is agreed to by the first website and the second website.

4. The computer-implemented method of claim 1, wherein the one or more token generation parameters include at least one of the account of the first website, a login domain name of the first website, and a time the automatic login token is generated.

5. The computer-implemented method of claim 1, wherein the automatic login token is a random character string.

6. The computer-implemented method of claim 1, wherein the account of the second website is not logged in to the second website by the client device before the automatic login token is verified.

7. A non-transitory, computer-readable medium storing one or more instructions when executed by a computer system to perform operations comprising:
   receiving, by a server of a second website, a visit request from a client device for logging in to an account of the second website, wherein the visit request is generated by the client device visiting an automatic login link generated by a server of a first website, wherein the visit request includes an automatic login token generated by the server of the first website based on one or more token generation rules agreed to by the second website for performing an automatic login on the second website, wherein the one or more token generation rules include a predetermined encryption algorithm and an encryption key that are stored in configuration information of a login domain of the second website, and wherein generating, by the server of the first website, the automatic login token comprises:
      obtaining the predetermined encryption algorithm and the encryption key from the configuration information of the login domain of the second website; and
      generating the automatic login token based on one or more token generation parameters encrypted by the encryption key using the predetermined encryption algorithm;
   querying, by the server of the second website, a login status of the account of the second website associated with an account of the first website;
   determining, by the server of the second website, that the account of the second website is in a logged-off state;
   in response, validating, by the server of the second website, the automatic login token based on one or more token validation rules agreed to by the first website; and
   in response to validating the automatic login token, authorizing, by the server of the second website, the client device to automatically log in to the account of the second website.

8. The non-transitory, computer-readable medium of claim 7, wherein the automatic login link includes a uniform resource locator (URL) address that includes an URL field of a target page, the URL address directing the client device to the target page after the client device automatically logs in to the second website with the account of the second website.

9. The non-transitory, computer-readable medium of claim 7, wherein the predetermined encryption algorithm is agreed to by the first website and the second web site.

10. The non-transitory, computer-readable medium of claim 7, wherein the one or more token generation parameters include at least one of the account of the first website, a login domain name of the first website, and a time the automatic login token is generated.

11. The non-transitory, computer-readable medium of claim 7, wherein the automatic login token is a random character string.

12. The non-transitory, computer-readable medium of claim 7, wherein the account of the second website is not logged in to the second website by the client device before the automatic login token is verified.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
 receiving, by a server of a second website, a visit request from a client device for logging in to an account of the second website, wherein the visit request is generated by the client device visiting an automatic login link generated by a server of a first website, wherein the visit request includes an automatic login token generated by the server of the first website based on one or more token generation rules agreed to by the second website for performing an automatic login on the second website, wherein the one or more token generation rules include a predetermined encryption algorithm and an encryption key that are stored in configuration information of a login domain of the second website, and wherein generating, by the server of the first website, the automatic login token comprises:
  obtaining the predetermined encryption algorithm and the encryption key from the configuration information of the login domain of the second website; and
  generating the automatic login token based on one or more token generation parameters encrypted by the encryption key using the predetermined encryption algorithm;
 querying, by the server of the second web site, a login status of the account of the second website associated with an account of the first website;
 determining, by the server of the second web site, that the account of the second web site is in a logged-off state;
 in response, validating, by the server of the second website, the automatic login token based on one or more token validation rules agreed to by the first website; and
 in response to validating the automatic login token, authorizing, by the server of the second website, the client device to automatically log in to the account of the second website.

14. The computer-implemented system of claim 13, wherein the automatic login link includes a uniform resource locator (URL) address that includes an URL field of a target page, the URL address directing the client device to the target page after the client device automatically logs in to the second website with the account of the second website.

15. The computer-implemented system of claim 13, wherein the predetermined encryption algorithm is agreed to by the first website and the second website.

16. The computer-implemented system of claim 13, wherein the one or more token generation parameters include at least one of the account of the first website, a login domain name of the first website, and a time the automatic login token is generated.

17. The computer-implemented system of claim 13, wherein the automatic login token is a random character string.

18. The computer-implemented system of claim 13, wherein the account of the second website is not logged in to the second website by the client device before the automatic login token is verified.

\* \* \* \* \*

UNITED STATES PATENT AND TRADEMARK OFFICE
CERTIFICATE OF CORRECTION

PATENT NO. : 10,785,207 B2
APPLICATION NO. : 16/722591
DATED : September 22, 2020
INVENTOR(S) : Lei Gong Page 1 of 1

It is certified that error appears in the above-identified patent and that said Letters Patent is hereby corrected as shown below:

On the Title Page

Item (30) – Below "2017." Insert -- Foreign Application Priority Data May 9, 2016 (CN) 201610302819.2 --, as a new field entry.

In the Claims

Column 23/Line 21 – In Claim 1, delete "web site," and insert -- website, -- therefore.

Column 23/Line 23 – In Claim 1, delete "web site," and insert -- website, -- therefore.

Column 23/Line 41 – In Claim 1, delete "web site," and insert -- website, -- therefore.

Column 23/Line 44 – In Claim 1, delete "web site," and insert -- website, -- therefore.

Column 23/Line 45 – In Claim 1, delete "web site," and insert -- website, -- therefore.

Column 24/Line 55 – In Claim 9, delete "web site," and insert -- website, -- therefore.

Column 25/Line 32 – In Claim 13, delete "web site," and insert -- website, -- therefore.

Column 26/Line 1 – In Claim 13, delete "web site," and insert -- website, -- therefore.

Column 26/Line 2 – In Claim 13, delete "web site," and insert -- website, -- therefore.

Signed and Sealed this
Ninth Day of November, 2021

Drew Hirshfeld
*Performing the Functions and Duties of the
Under Secretary of Commerce for Intellectual Property and
Director of the United States Patent and Trademark Office*